Aug. 9, 1938.  F. VON OPEL  2,126,431
AUTOMATICALLY OPERATED TRAFFIC CONTROL SYSTEM
Filed April 25, 1933  5 Sheets-Sheet 5

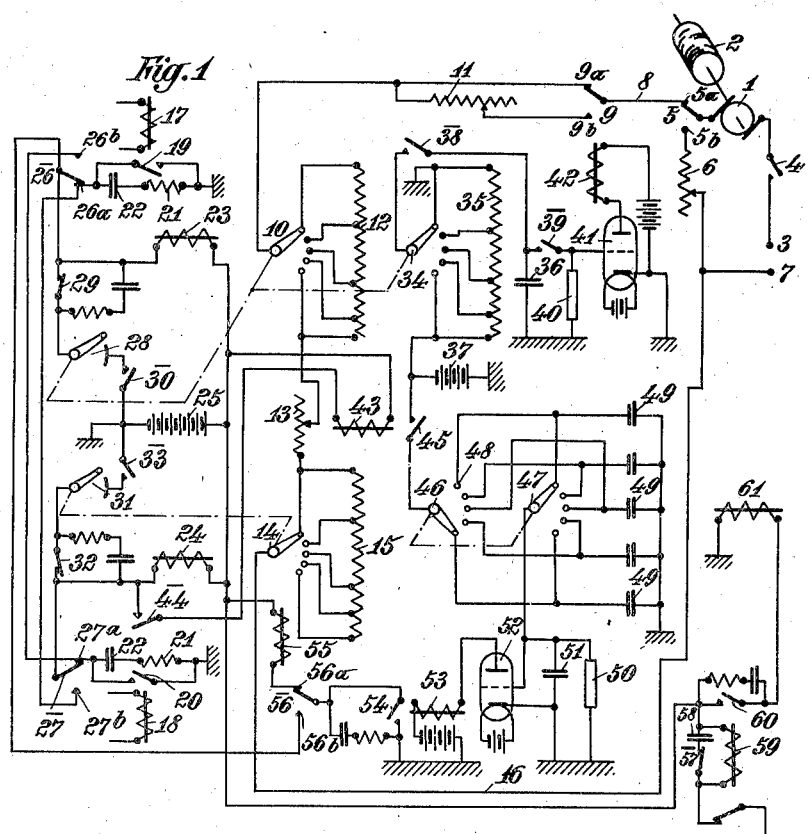

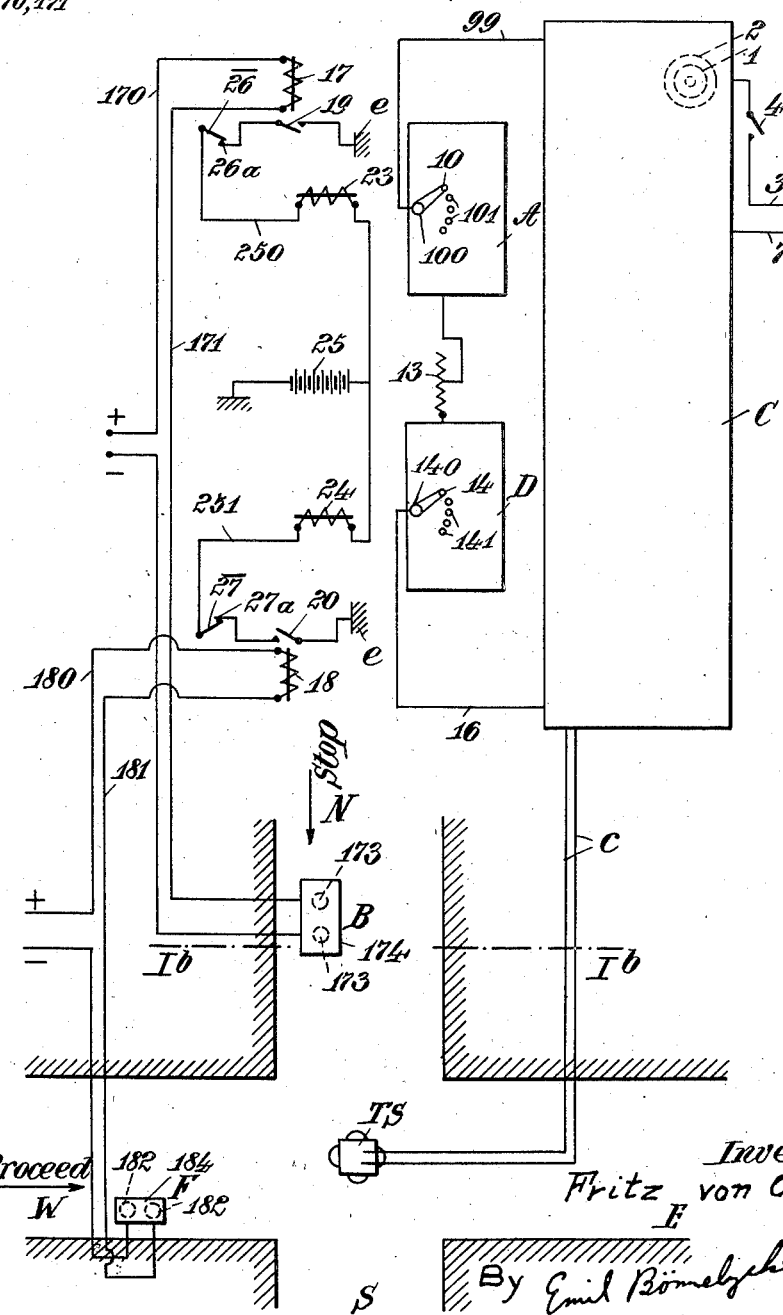

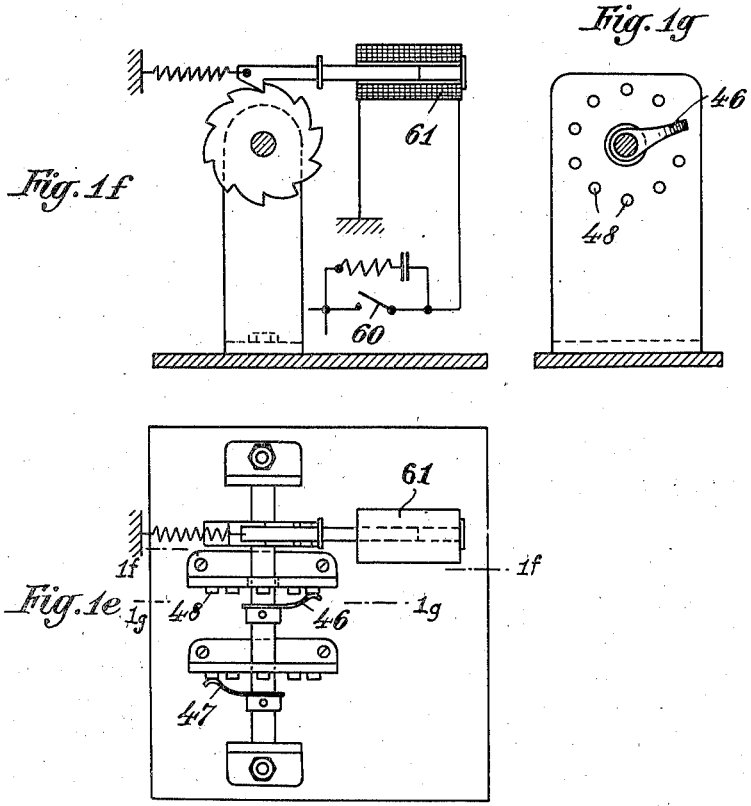

Inventor
Fritz von Opel
By Bomelycke Young, Emery & Thompson attys.

UNITED STATES PATENT OFFICE 2,126,431

AUTOMATICALLY OPERATED TRAFFIC CONTROL SYSTEM

Fritz von Opel, Berlin-Charlottenburg, Germany

Application April 25, 1933, Serial No. 667,868
In Germany April 26, 1932

6 Claims. (Cl. 177—337)

It is known to determine the traffic density of a track or path, i. e., the number of vehicles passing a control point in a unit of time, and to change over from the normal periodic cycle of signalling to another predetermined fixed cycle when the traffic density rises above or sinks below a definite value. The counting of the number of vehicles may hereby be performed by means of any convenient devices, for instance contact switches or members embedded in the road, photoelectric devices or the like. The term "cycle" in this connection means one complete series of signals, for example, from the beginning of a go signal to the beginning of the next go signal.

This arrangement does not accommodate itself smoothly enough to the traffic, since even a plurality of predetermined cycles will not cover all variations in the continuously changing traffic stream and, above all, since the change from one cycle to another, caused by measuring the traffic density, cannot be performed with sufficient suddenness. In order to measure the density of traffic, the traffic must be controlled during a definite period of time, and since a regulation only can be effected after the elapse of this period, the regulation, with rapidly varying traffic always takes place too late.

It is also known to set the go signal for a predetermined time (10 seconds) by means of a vehicle passing the counting point and a time switch and to repeat this operation, eventually until a maximum time (30 seconds) has been reached, whereupon the go signal by means of a second time switch is switched over to the other street. Also this arrangement is practically of no use, since the maximum time is already reached by three vehicles and the following vehicles, therefore, will exert no influence at all on the system.

All hitherto methods known to me also possess the drawback in common, that only one track or street is considered. The vehicles traveling in this street are controlled and are allowed to proceed at definite intervals but the traffic density in the intersecting street is not taken into account.

The present invention relates to a signal device which is influenced from the street. According to the invention the signal apparatus of a street intersection, for instance a signal lamp, is individually, continuously and cyclically operated by means of a suitable switching device, whereby the cycle of the switching operations is influenced by the number of vehicles passing a counting or control point on the track. Hereby the vehicles passing the free street will cause a delay in the change of signal, i. e., an extension of the "green" period, whereas the vehicles arriving and stopping in the blocked street will cause an acceleration of the change of signal, i. e., a shortening of the "red" period. In accordance with the invention it is also possible to consider the number of vehicles passing on both tracks simultaneously and hereby to govern the traffic in conformity with the density of traffic on both tracks. Suitable devices of any kind, for instance clocklike devices adapted to perform the switching operations at definite intervals, may be used for creating the automatic cycle of the signal changes and for influencing same. It has been found to be particularly advantageous to change the signals by means of a moving device operated by any suitable means, for instance, by a switch drum driven by an electromotor.

Devices of the above named kind may be influenced in numerous different ways in order to retard or accelerate the change-over of the signal. In accordance with the present invention a step-by-step switching gear may be employed, which is actuated by the impulses originating from the counting points in the street.

The continuous regulation of the vehicle traffic, i. e. the changing of the signals, may now be performed by influencing the speed of the switch drum in opposite senses, i. e., by decreasing or increasing this speed. For this purpose the apparatus may be equipped with ratchet mechanisms which are driven by the counting impulses from the counting points on the track. At this arrangement the regulating effect influencing the cycle corresponds to the difference between the accelerating and the retarding impulses.

When the traffic is controlled continuously it is as already mentioned, possible to design the control devices in such a manner, that the numbers of the vehicles driving through both streets are considered simultaneously and a control is exerted which corresponds with the traffic conditions on both tracks. It is of no consequence whether two or more streets intersect each other in the place in which the control device is arranged. The purpose of the device is to control the traffic in such a manner, that the total stopping time of all vehicles is reduced to a minimum. For this purpose the devices are completed and designed in such a manner that a division of the numbers of vehicles driving on both tracks is made, whereby the obtained quotient is used to influence the cycle in which the signals are changed. The alteration of this cycle is called forth by influencing the running time of the switching apparatus by means of regulating devices, such as brakes, resistances (when motor drive is used) or the like, which are switched in or out according as necessity arises.

A switch drum of this kind may be driven by means of any suitable force, but preferably an electric motor is used. According to the invention the drum may also be driven by means of an electromagnetic ratchet mechanism, which is actuated by a self-releasing relay arrangement. In this case the switching cycle may be changed by arranging condensers parallel to the relay winding and switching these condensers in or out. For this purpose the relay is equipped with a fixed condenser the discharge time of which is varied by means of resistances which are coupled in series or parallel to the condenser. The switch drum may, according to the present invention, also be used for other purposes than that named above, for instance for reversing the polarity. The drum may be used for switching in a constant regulating element, for instance a constant resistance, in front of the device controlling the cycle of the switching operations. This may be made simultaneously with the switching in of the intermediate signal (for instance the yellow light) or at another moment. The duration of the intermediate signal is made independent of the length of the head signal. The effect of this regulating element may also be varied by hand and the length of the intermediate signal may therefore be varied as desired.

The above mentioned division of the numbers of vehicles driving over both tracks or the determination of the quotient may, in accordance with the invention, be performed by means of two step-by-step switches adapted to switch in or out the regulating elements which control the cycle of the signal changes. The step-by-step switches are preferably not permanently coordinated to the same street, but are exchanged (preferably by means of the switch drum) so that one switching gear permanently operates on the street which is blocked, whereas the other operates on the street which is free. Each time a vehicle passes by, the appertaining switch is advanced one step, whereby the switch which is coordinated to the blocked street at each step will switch off additional regulating elements and the signal changing operation is made faster. The switch coordinated to the free street will, however, at each step switch on additional regulating elements, whereby a slowing of the signal changing operation is caused.

If at each step of the step-by-step switches only regulating elements of equal magnitude were switched in or out, again only a subtraction would result. In accordance with the present invention, however, the regulating elements coordinated to the series of steps of the step-by-step switching gears are not dimensioned after a linear quantity but after a logarithmic law in such a manner that always the same regulating effect is obtained irrespective of the number of vehicles in the free street and the blocked street as long as the relationship of the number of vehicles in the streets remains the same. The device operates in the same manner as a slide rule, which also is graduated after a logarithmic system.

If equal logarithmic values of the regulating elements were coordinated to the corresponding steps of the step-by-step switches the number of vehicles allowed to proceed (i. e. the number of vehicles which are present between the counting point and the intersection) would be assumed to be equal to the number of vehicles stopped in the blocked street. This however, does not correspond with the real situation, since the traffic in the freed street has not been valued sufficiently. In accordance with the present invention the relation between the values of the regulating elements coordinated to the corresponding steps of the step-by-step switches is made equal to the relation between the number of vehicles which are simultaneously driving over the measuring distance of the freed street and the arithmetical mean value of the number of vehicles which are present within the measuring distance of the blocked street at the beginning and at the termination of the blocking. (It is hereby assumed, that the traffic is of equal intensity on both driving tracks and is uniformly distributed over same.) It may for instance be assumed, that 60 vehicles arrive from both sides per minute at a speed of 10 m. per second, that the length of the measuring distance is 100 m. and that the normal duration of the go or stop signal (when adjusted for uniform load on both streets) is 25 seconds. In this case 10 vehicles will permanently be present within the measuring space of the freed street, whereas the blocked street will show 10 vehicles at the beginning of the blocking and 35 vehicles at the end of the blocking, i. e., an average number of 22½ vehicles. The value of the regulating element coordinated to one step of the step-by-step switch of the freed street must therefore be 2½ times as high as the value of the corresponding regulating element of the switch of the blocked street. When this calculation is based on a higher speed than 10 m. per second a still higher proportional value is obtained. If it is desired to adjust the system for any desired sensitivity, i. e. to attain the maximum switching times by more or less great quotients, this may according to the invention be performed by alternating the relation between the value of the regulating element of one step and the total value of all regulating elements. In accordance with the invention, therefore, each switch comprises several differently dimensioned series of regulating elements, which may be selectively switched on by hand.

Besides the regulating elements switched in or out by the step-by-step switches, the invention also comprises a regulating element (a constant resistance, condensers or the like) which may be selectively adjusted by hand and which controls the maximum admissible duration of the go and stop signals. The present invention aims at controlling the traffic continuously and vehicles which already have passed the intersection on the freed street must therefore be prevented from influencing the system any more, i. e. vehicles which have passed the counting point and advanced the switch one step must be subtracted when passing the intersection. This may for instance be attained by arranging a second subtracting device in the intersection. The same effect may in accordance with the invention be obtained in a much simpler manner by employing automatic means which make it possible to maintain the vehicle in the counting only for the average time which is required for passing from the counting point to the intersection. The distance between the counting point and the intersection must of course be dimensioned in such a manner, that all vehicles arriving when the street is blocked can pass the counting places and stop between the counting place and the intersection.

According to the invention, the step-by-step switch may be reversed in the manner that the impulse for the reversing operation is prepared by the vehicle passing the counting point. Hereby the release, i. e. the transmission of the impulse to the switch is influenced by a delaying device and does not take place until a period of the same length as the average driving time between the counting point and the intersection has elapsed.

The delaying or retarding device may comprise two mutually insulated contact arms adapted to slide over a number of condenser contacts. The arms are so arranged, that the first arm charges the condenser with which it contacts with the impulse caused by the primary counting, whereas the second arm, which reaches the same contact after the elapse of the said period, transmits this charge to a relay which causes the reversing of the switch.

At the moment the intermediate signal is switched on the vehicles for which the subtracting device is prepared must stop and can no more pass the street intersection. The condenser charges prepared for the reversal of the switch for the free street can however be utilized for advancing the switch for the blocked street, which switch of course previously has been brought into zero position.

In accordance with the invention, a definite time depending on the number of vehicles which have gathered is allotted to the vehicles for driving away when the passage is opened. This minimum time is fixed by means of a condenser charge which is dependent on the number of vehicles which have gathered. At the moment the green signal appears, the condenser holding this charge connects a constant regulating element over a relay. This element may, if desired, be manually adjustable and the connection lasts during the entire discharge time of the condenser, so that the regulating under the influence of the quotient will not take place before this discharge has been finished. The condenser may be charged by equipping the switch for the blocked street with a second arm which switches on a voltage corresponding to the position of the switching gear and the number of vehicles.

The principles on which the invention is based and the objects of the invention have been described and a particularly simple constructional form of the invention will be described in the following. The switch drum may be driven by the motor operating the lamp, but also other means may be used for this purpose.

The measuring places may be equipped with counting devices of any suitable kind, for instance, electrical or optical counters, but preferably the counting device described below should be used.

It is of course understood that in referring to a free signal it is obvious that it can be referred to as a green or go signal. Likewise the intermediate signal means a yellow or caution signal and a blocked signal means a red or stop signal. Any other color combinations can of course be used.

Referring to the drawings:

Fig. 1 is a wiring diagram showing the electrical devices and circuits needed. In order to facilitate the understanding of the operation of the system, the switches which are located on the switch drum and controlled by contacts on the same are shown in their proper places in the diagram and a horizontal streak or dash is placed above the reference numerals of these switches to differentiate same from the switches which are independent of said drum.

Fig. 2 shows in the form of a diagram the sequence of the switching operations performed by the switch drum and the dependency of such operations from the angular position of the drum. The upper half of the diagram shows the switching operations needed for one direction of travel and the lower part shows the operations needed for the second direction of travel.

Figure 1D:
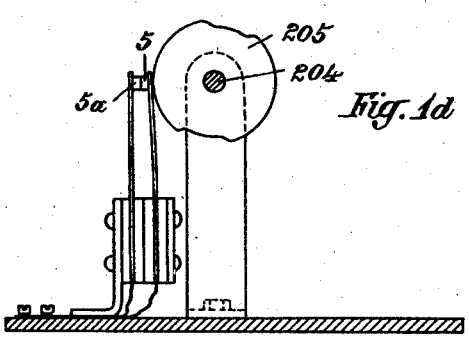
Fig. 1d is a cross-sectional view of the structure of Fig. 1c taken on line 1d—1d of Fig. 1c.

Referring now to the drawings, and first to Figs. 1a and 1b, the arrangement of the system with respect to a street crossing will first be described. Streets N—S and W—E cross at right angles. It is understood, of course, that the term "street crossing" includes any point where lines of traffic intersect, such as squares, etc.

TS is a traffic signal of any suitable type and equipped, for instance, with red lamps for "stop", green lamps for "go" and yellow lamps for "caution".

The traffic signal TS is operated by a switching drum 2 on the shaft of a motor 1. The drum and the motor are housed in a casing C and wires c connect the drum 2 to the traffic signal TS.

The street N—S is supposed to have been blocked, and its measuring place is marked "B". The vehicles moving along the street at its right-hand side, in the direction of arrow "Stop", run on a vehicle-actuated control 174 at the measuring place. The control may be designed as shown in Fig. 1b where a ramp 174 is hinged at 175 and forced up by a spring 176. The ramp 174 has a contact plate 172 on its lower face which cooperates with a pair of contacts 173 on the base plate of the control. Street W—E is supposed to be free, and the vehicles moving in the direction of arrow "go" run on a vehicle-actuated control 184 or ramp 184 at the measuring place "F". This control may be designed like the one shown in Fig. 1b, with a ramp and a pair of contacts 182 on the base plate.

The contacts 173 of the control 174 at "B" are connected to wires 170 and 171 which make up the circuit of a relay 17 and are supplied with energy from any suitable source, not shown. Similarly the contacts 182 at "F" are connected to the wires 180 and 181 of a relay 18. The relay 17 controls a switch 19, and the relay 18 controls a switch 20. The two switches are grounded at e.

The motor 1, with its switch drum 2, is housed in the casing C together with other parts and circuits which will be fully described with reference to Fig. 1. The switch drum 2, through suitable means, not shown, controls a switch 26 which cooperates with a contact 26a in the circuit of switch 19. The switch 26 is connected to a battery, for instance, a storage battery, 25 by a wire 250, and the wire includes a driving coil 23 for the speed increasing device, A. Similarly, a switch 27 which is also controlled from drum 2, is connected to the battery 25 by a wire 251 which includes a driving coil 24 for the speed decreasing device D.

The motor 1 is supplied with current from a system whose wires are indicated at 3 and 7, and a manually operated switch 4 is inserted in the wire 3. Through switching means to be described with reference to Fig. 1, a wire 99 is connected to the system at one end while its other end is attached to the shaft 100 of a step-by-step switch 10 of the device A which cooperates with a set of contacts 101. The shaft 140 of a similar step-by-step switch 14 which cooperates with a set of contacts 141 on the device D is connected to the system by a wire 16.

It will be understood that when a vehicle runs on the ramp 174 at B in the blocked street N—S, the contacts 173 are closed and the relay 17 is excited. The relay now closes the switch 19 and prepares the circuit 250, 26, 26a of the driving coil 23 for the device A so that the accelerator is operated as soon as the switch 26 has been closed by the switching drum 2. Similarly, when a vehicle runs on the ramp 184 at F in the free street W—E, the contacts 182, 183 are closed and the relay 18 is excited. The switch 20 is closed and the circuit 251, 27, 27a of the driving coil 24 for the device D is prepared. The device D is operated as soon as the switch 27 has been closed by the switching drum 2.

Only two vehicle-actuated controls have been shown at B and at F but obviously the crossing requires two more controls which have been omitted as their design and operation are exactly the same as for the two controls which have been described.

Figure 1C:
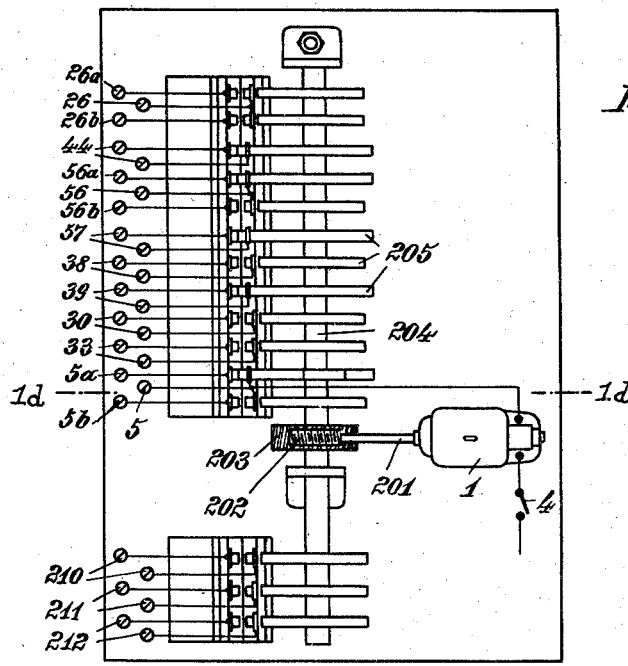
Fig. 1c is a diagrammatic top view of the motor together with the cams and switches.
Figure 1K:
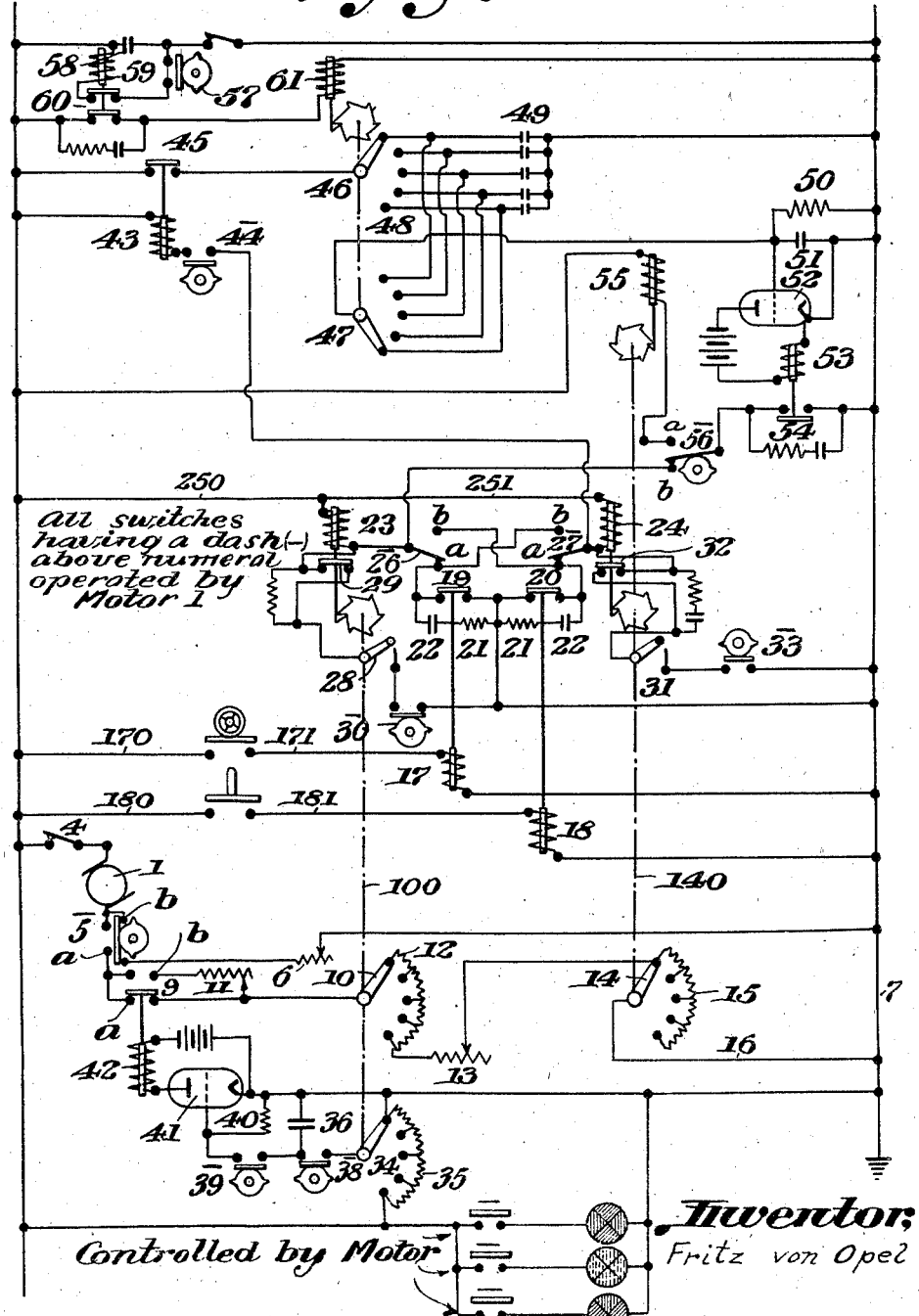
Fig. 1a is a diagram showing the connections of the means for operating the speed increasing and decreasing devices, to vehicle actuated controls at a street crossing.
Fig. 1b is a section on the line 1b—1b in Fig. 1a, drawn to a larger scale.
Fig. 1e is a top view of the switches for the condensers shown in Fig. 1.
Fig. 1f is a cross-sectional view, partly diagrammatic, showing a switch and electro-magnetic coil taken on line 1f—1f of Fig. 1e.
Fig. 1g is a cross-sectional view of the switch taken on line 1g—1g of Fig. 1e.
Fig. 1h is an across the line diagram of the system.

Referring now to Fig. 1, the motor circuit includes a switch 5 having contact positions 5a and 5b. In the latter position, which is taken up only during the caution or yellow period, the motor 1 is connected to a network terminal 7 over a resistance 6. Through this measure a constant yellow period is secured.

In position 5a, the motor is connected by the switch 5 and over the conduit 8 to a switch 9 which is operated by a special relay 42 as will be described. The switch 9 connects the motor 1 over contact 9a directly with the arm of the step-by-step switch 10 of the speed increasing device. Over contact 9b the connection is established through a resistance 11. From the switch 10, which is shown with all resistance cut in, the circuit continues over the resistance 12 and a manually adjustable resistance 13 to the arm of the step-by-step switch 14 of the speed decreasing device D and from this point over an additional resistance 15 or the wire 16, in accordance with the position of the switch 14.

Referring to Figs. 1c and 1d the motor 1 is connected at one brush to the switch 4 and to the switch 5 by the other brush as shown in Fig. 1. The motor drives a worm 202 by means of its shaft 201 and the worm 202 meshes with a worm gear 203, on a shaft 204 provided with a plurality of cam discs 205.

A plurality of binding posts 26a, 26, 26b, 44, 56a, 56, 56b, 57, 38, 39, 30, 33, 5a, 5, 5b, 210, 211 and 212 are provided which are in circuit with the various switch contacts operated by the cams 205. The posts and contacts of Fig. 1c correspond as a series to the diagram of Fig. 2. For the switches 26, 56, and 5 two adjacent contacts 26a and 26b, 56a and 56b and 5a and 5b are provided which are adapted to be energized selectively by their cam discs 205.

The resistances 12 and 15 are dimensioned in stages after a logarithmic law and are connected in such a manner to the switches 10 and 14 respectively that an operation of the switch 10 will cause parts of resistance 12 to be cut out and a corresponding operation of the switch 14 will cause parts of the resistance 15 to be switched in. On account of the logarithmic graduation of the resistances 12 and 15 the difference between the resistances 12 and 15 which at any moment is present in the motor circuit will be proportional to the quotient of numbers of steps the switches 10 and 14 have been shifted. These switches are arranged in such a manner and the number of tapping points is so chosen, that a correct operation is secured even when the highest possible number of impulses within the red or green period is occurring. The switch 10 increases the motor speed and is accordingly driven from the measuring place B of the blocked street, whereas the switch 14, which decreases the motor speed, is operated from the measuring place F of the free street. The absolute value of the resistances 12 and 15 corresponds at equal numbers of tappings, with the ratio in which the vehicle numbers in the free and in the blocked street are estimated.

The influence of the normal stop and go periods is dependent on the relationship of the number of vehicles in the free and the stop streets. It should, to explain an example, when the traffic in the free street is to take care of 100 vehicles in a certain unit of time and the traffic in the stop street is to take care of 50 vehicles, then an increase in the number of vehicles by 10 in the free street will exercise the same influence as an increase of 5 vehicles in the stop street. As the speed of the motor 1 (Fig. 1) is dependent on the sum of the resistances switched in by the switches 10 and 14 thus the 101st vehicle must not have the same resistance value as the 51st vehicle in the free street. The amount of the increase or decrease of the current from the resistances must follow in a definite relationship to the amount of the resistance cut in or cut out. This can only be attained when the resistance values between the individual points of the switches 10 and 14 are calculated according to a logarithmic law. If for example, by the 100 vehicles in the free street with the aid of the switch 10, 100 ohms are switched in and the 101st and the 102nd vehicles switch in one ohm each, and if the 50 vehicles of the blocked street have switched in 50 ohms from the beginning of the resistance 15, then the 51st vehicle must switch in 2 ohms, since for the same percentage of changes of the amount of traffic a change in the sum of the resistance in the motor circuit will not take place.

The resistance 13 may be manually adjusted to accelerate or retard the motor 1 in order to lengthen or shorten the minimum time intervals between the green, yellow and red signals.

The switches 10 and 14 are mentioned as operated by vehicle-actuated controls from the measuring places in the free and in the blocked streets respectively. In Fig. 1, only the relay 17 of the controls of the blocked street and the relay 18 of the free street are indicated. These relays operate switches 19 and 20 in parallel with condensers 22 and resistances 21 serving as spark extinguishers when the switch is opened, the switch 19 when closed passing a current through the driving coil 23 of the switch 10 to actuate the latter and the switch 20 is closed, similarly operating the driving coil 24 of the switch 14. The source of current is in this case an accumulator 25. The current flows either over the coil 23 or over the coil 24 and over the switch 19 or 20 to ground and back to battery. By means of the switches 26 and 27, the switch 10 will always be coupled to the measuring places of the blocked street and the switch 14 will always be coupled to the measuring place of the free street.

The vehicle-actuated controls at B and F, the relays 17 and 18, and the means by which the accelerator A and the decelerator D are operated stepwise under the control of the corresponding relay and the switching drum 2, as described, make up counting devices.

The storage battery 25 is also connected to two circuits which serve for returning the switches 10 and 14 to their normal positions when the signal is changed. The shafts of these switches also carry other switch arms 28 and 31 respectively, which are connected to ground over the switches 30 and 33, respectively, when the switches 10 and 14 are not in their starting position. When these switches are closed by the switch drum 2, the switches 10 and 14 under the influence of the switches 29 and 32, respectively, (which are opened each time their own rotary magnets are attracted) continue to rotate until the initial position again has been reached. Here the driving circuits are opened by the switches 28 and 31.

The device is as before mentioned arranged in such a manner, that the duration of the free signal always will be of such a length, that all waiting vehicles will have opportunity to pass the intersection. For the minimum time a lower limit is set by means of the resistance 13. In order to secure the minimum time needed by the vehicles gathering during the red signal period for passing the intersection, the switch 10 is connected to another switch 34 adapted to connect parts of a resistance 35. The circuit of this resistance is fed from a storage battery 37 or from parts of the battery 25. The voltage drop over the part of the resistance 35 in circuit with the arm 34 is used to charge a condenser 36. The charge on this condenser is thus at a given voltage dependent on what part of the resistance over which the potential is applied, that is on the position of the arm 34. In the present case the charge will thus be increased when the number of resistance stages in the circuit is increased. The charge is thus also dependent on the number of vehicles which arrive at the control place B and actuate the counting device including the relay 17, and is a measure for the number of vehicles which are present on the measuring space and which primarily must be considered when the signal is to be changed. In accordance with the invention, a switch 38 is employed, which, after the red light has disappeared, is closed during a short interval by the switch drum 2. The charge which in this way is applied to the condenser 36 corresponds, as mentioned, to the number of vehicles which at a given moment are stopping in the blocked street. Shortly afterwards the switch drum 2 closes the switch 39 and the charge of the said condenser flows over this switch and a resistance 40 to ground. (For a given resistance 40 the value of this charge is a measure of the duration of the discharge.) Simultaneously the condenser 36 is connected to the grid of an amplifier tube 41 over the switch 39 and a current is generated, which will flow through the relay 42 until the condenser has been discharged. The relay 42 attracts the switch 9 which thereby is brought into the position 9b so that resistance 11 is included in the motor circuit. The speed of the motor 1 is therefore reduced as long as the charge of the condenser 36 is able to maintain the current in the relay 42. In this way the number of already waiting vehicles is automatically considered.

The impulses of the relays 17 and 18 and resulting movements of the switch arms 10 and 14 influence the speed of the motor 1 in such a manner that the resultant speed change will correspond to the quotient between the numbers of impulses. It has already been mentioned, that in this comparison only the vehicles within the measuring space proper should be considered and that the vehicles in the free street which already have passed the intersection must be subtracted. The operation of the subtracting device is based on the assumption that each vehicle needs a definite average time for passing the measuring space, and the device comprises a relay 43 which is connected to the battery 25 and which relay 43 when the switch 44 is closed by the drum 2, receives the current as often as the switch 20 operated by the free street relay 18 is operated. Relay 43 operates a switch 45, which in closed state connects a switch arm 46 to the battery 37. The arm 46, which is located on the same shaft as the arm 47, is at first rotated by a drive magnet 61 hereinafter described, at constant velocity and hereby contacts with the contacts 48 of a number of condensers 49, which thus are charged in turn during closed periods of the switch 45. The maximum number of charged condensers corresponds to the maximum number of vehicles present in the control or measuring space of the free street. The switch arm 47 at the same time slides over contacts corresponding to the contacts 48, but lags behind the arm 46 to an extent corresponding to the average time which a vehicle needs for traversing the measuring or control space. This time will in the following be named the "control time". When the arms 46 and 47 are rotating their angular displacement thus corresponds to the control time, under consideration of the angular velocity, and the interval between the charging of any condenser and the discharge of same over the arm 47 and the resistance 50 is therefore equal to the control time. The condensers are discharged within a very short time determined by means of a condenser 51 in parallel with the resistance 50. The switch arm 47 is also connected to the grid of an amplifier tube 52, which, like the tube 41 controls the circuit of a relay 53. Each time a charged condenser is connected to the grid of the tube 52 the relay 53 will operate a switch 54, which when switch 56 is in position 56a by means of the drum 2, closes the circuit of the coil 55 of a magnet 58 rotating the switch arm 14, which coil is connected to battery 25. When the switch 54 is operated and the coil 55 is energized the switch 14 however is reversed as compared with the effect of the driving coil 24. In this way those switching steps will be eliminated which have been caused by the coil 24 after the elapse of the control time. When the subtracting device is formed in the manner described and the signal is changed from green to yellow, any vehicles which in this moment are within the control space and are prevented from passing the intersection should not be subtracted. The number of these vehicles must therefore be transferred to the counter for the blocked street. This operation is performed when the switch drum 2 forces the switch 56 into the position 56b and closes a switch 57. When the switch 57 is closed a condenser 58 discharges through the coil of a self-interrupting relay 59 thereby causing a switch 60 in the circuit of the drive magnet 61 to be opened and closed at short intervals. The shaft of the switch arms 46 and 47 will then be driven by the coil 61 at a higher velocity than usual. The condensers 49 discharge swiftly and the operations of the switch 54 are effected at very short intervals, but instead of the coil 55 now the driving coil 23 of the switch 10 is operated. In this way the number of the vehicles which still are in the control space is transferred to the switching gear of the blocked street.

Figs. 1e, 1f and 1g show the structure of the coil and the switches 46 to 48. The switch arms 46 and 47 are mounted on a common shaft and they are intermittently rotated by means of the ratchet mechanism mounted on the shaft and operated by the coil 61.

Fig. 2 shows in the form of a diagram the sequence of the switching operations performed by the switch drum and the dependency of such operations from the angular position of the drum. The upper half part of the diagram shows the switching operations needed for one direction of travel and the lower part shows the operations needed for the second direction of travel.

As will be understood the contact 38 is closed for a short time immediately after the switching operation from red to yellow. Hereby the condenser 36 is charged over the switch arm 34 with the voltage impressed over the operative part of the resistance 35, which is a function of the number of vehicles blocked at the intersection. The switch 38 opens again almost at once and the switches 30 and 33 are momentarily closed whereby the contact paths of the second or restoring arms 28, 31 of the step-by-step switches 10, 14 are grounded. If these arms are not in their initial position they will be restored under the influence of the self-interrupting contacts 29 and 32, which are operated by the rotary magnets 23, 24, until the initial position is reached and the circuit is interrupted. This rotary movement of restoration is performed at high speed and the contacts 30 and 33 are therefore only closed for a short time. Subsequently the switches 56 and 57 are operated, as hereinbefore described. The step-by-step switches are thus ready to operate again before the next go signal.

When the go signal is set the switch 39 is closed and the charge of the condenser 36 is impressed on the grid of the tube 41. The relay 42 is energized and remains in this condition until the condenser 36 has been discharged over the member 40. Hereby the resistance 11 is connected to the circuit of the lamp motor as an additional resistance thus slowing down the motor and lengthening the go interval whereby all the vehicles will have ample time to drive away.

The position of the change over switch 5 is changed at the end of each go signal, in order to secure a constant yellow period. The purpose of the switches 26, 27 and the switch 44 will be evident to anyone skilled in the art.

I claim as my invention:

1. An automatic traffic control system for interfering lanes comprising a signalling device including go and stop signals, for the lanes for the control of the movement of traffic thereover, an electric circuit, a drive including an electric motor in said circuit and a switching drum for operating said signalling device to display signals for predetermined periods dependent on the speed of said motor, a pair of resistances in the circuit for controlling the speed of the motor each having taps for cutting resistance in and out in determined steps, the magnitude of the resistance between successive taps varying according to logarithmic law, a vehicle-actuated control for the respective lanes, means responsive to actuations of one of said controls for cutting out one of said resistances step-by-step to increase the speed of the motor, and means operable substantially simultaneously with the prior said means responsive to actuations of the other control for cutting in the other resistance step-by-step to decrease the speed of said motor.

2. An automatic traffic control system for interfering lanes comprising a signalling device including go, stop, and caution signals for the lanes for the control of the movement of traffic thereover, an electric circuit, a drive including an electric motor in said circuit and a switching drum for operating said signalling device to display signals for predetermined periods dependent on the speed of said motor, a pair of resistances in the circuit for controlling the speed of the motor, a vehicle actuated control for the respective lanes, means responsive to actuation of one of the controls for cutting out one of said resistances to increase the speed of the motor, means operable substantially simultaneously with the prior said means responsive to actuations of the other control for cutting in the other resistance to decrease the speed of said motor, and a manually variable resistance in the circuit for determining the period of the caution signal including means connected to the various resistances and controls during the respective periods to connect only the last-named resistance during the caution period.

3. An automatic traffic control system for interfering lanes comprising a signalling device including go and stop signals for the lanes for the control of the movement of traffic thereon, an electric circuit, a drive including an electric motor in said circuit and a switching drum for operating said signalling device to display signals for predetermined periods dependent on the speed of said motor, a vehicle actuated control for the respective lanes, means responsive to actuation of one of the controls for increasing the speed of the motor, means responsive to actuation of the other control for decreasing the speed of the motor, a condenser in said circuit, means for charging said condenser according to the vehicles blocked in the stop street, said means including a resistance in the circuit variable in step with the motor speed increasing means and a source of current arranged to charge the condenser with the voltage drop across the thus varied resistance, means for discharging said condenser when a signal changes from stop to go, and means operated by the discharge of the condenser for decreasing the speed of the motor for the go signal.

4. An automatic traffic control system for interfering lanes comprising a signalling device including go and stop signals for the lanes for the control of the movement of traffic thereon, a drive for operating the signalling device to display signals for predetermined periods dependent on the speed of the drive, means for increasing the speed of the drive by steps of predetermined magnitude varying according to a logarithmic law, separate means for decreasing the speed of the drive by similar steps, a vehicle-actuated control in the stop street said control operating the speed increasing means, and a vehicle-actuated control in the go street said control operating the speed decreasing means, the resultant speed of the motor corresponding to the ratio of the two members of steps through which the aforesaid two speed change means are operated.

5. An automatic traffic control system for interfering lanes comprising a signalling device including stop and go signals for the lanes for the control of the movement of traffic thereover, a drive means of variable speed operating said signals to display said signals alternately to said lanes for predetermined periods dependent on the speed of the drive, a vehicle actuated control for the respective lanes, means responsive to actuations of said control in a lane when it has the go signal to decrease the speed of said drive, each successive actuation further decreasing the speed and means responsive to actuations of said control in another lane, during last said go display to increase the speed of the drive, each successive actuation further increasing the speed, and said drive means including an electric motor and a switching drum for operating said signalling device to display signals for predetermined periods dependent on the speed of said motor.

6. An automatic traffic control system for interfering lanes comprising a signalling device including stop and go signals for the lanes for the control of the movement of traffic thereover, a drive means of variable speed operating said signals to display said signals alternately to said lanes for predetermined periods dependent on the speed of the drive, a vehicle actuated control for the respective lanes, means responsive to actuations of said control in a lane when it has the go signal to decrease the speed of said drive, each successive actuation further decreasing the speed, means responsive to actuations of said control in another lane, during last said go display to increase the speed of the drive, each successive actuation further increasing the speed, said drive means including an electric motor and circuit therefor and a switching drum for operating said signalling device to display signals for predetermined periods dependent on the speed of said motor, and a pair of resistances connected in said circuit to the motor for controlling its speed to increase or decrease the speed of said motor.

FRITZ v. OPEL.